3,387,475
PROCESS FOR THE MANUFACTURE OF SHEET METAL ARTICLES COATED WITH A THERMOPLASTIC RESIN
Werner Seipp, Gerhard Drechsler, and Siegfried Bloeck, Singen Hohentwiel, Germany, assignors to Swiss Aluminium Ltd., Chippis, Switzerland, a joint-stock company of Switzerland
No Drawing. Filed Jan. 21, 1966, Ser. No. 522,070
Claims priority, application Switzerland, Jan. 26, 1965, 1,083/65
6 Claims. (Cl. 72—46)

This invention relates to a process for the manufacture of sheet-metal articles coated with a thermoplastic synthetic resin by forming or shaping sheet metal so coated. Such formed or shaped sheet-metal parts are frequently used in the manufacture of various types of apparatus. In particular forming processes, such as deep drawing or other types of drawing, are frequently used for the preparation of containers of all kinds from sheet metal coated with synthetic resin. "Sheet metal" as employed herein includes thin metal strips and foils, such as thin aluminum strip or foil from which so-called hard foil containers for the food industry are produced. While the invention is particularly applicable to the forming of aluminum strip or foil, and will therefore be described primarily with reference to the forming of such material into containers, its use is not limited to the forming of aluminum.

It has been found that fine cracks frequently occur in the layer of synthetic resin at the shaped parts of coated metal sheets as a result of the stresses present in the layer of synthetic resin after the forming operation. Foreign substances, such as water, oils and greases from the lubricants employed for the forming operation, or substances from the materials stored in the containers may penetrate through these cracks and cause detachment of the layer or synthetic resin or produce corrosive attack on the aluminum. Particularly detrimental and frequent is the formation of cracks in filled containers which have been subjected to a sterilization treatment in hot water.

According to the invention, the layer of synthetic resin is heated up to its melting point after the forming of the sheet metal and then allowed to cool. By suitable choice of the rate of heating of the coating or resin, depending on the time which has elapsed since the forming operation, the stresses produced in the coating by the forming operation are greatly reduced or even eliminated and there is far less likelihood of cracks being subsequently formed. Moreover, the grease resistance of the coating is improved by this treatment, i.e. the swelling or grease absorption of the coating is reduced. The process is particularly suitable for the manufacture of containers of aluminum strip or foil which are coated with polyolefin, for example polyethylene or polypropylene.

It has already been proposed to melt thermoplastic resin coatings on metal sheets and foils for a short time and to emboss them prior to forming the sheets for the purpose of improving the adhesion of the coating. It has been found, however, that in spite of this treatment, cracks occur in the coating of synthetic resin after forming the sheet. Melting of this coating prior to forming has no effect in this respect on the behaviour of coating after forming.

The cracks in the layer of synthetic resin do not generally occur immediately after the forming operation, so that there is a certain time during which the stresses may be reduced. Once a crack has formed, however, it cannot be cured by melting the coating, as the edges of the crack do not flow together during melting. It is found that the minimum rate at which the coating must be heated to its melting point to avoid subsequent formation of cracks is in some way inversely related to the time which has elapsed since the forming operation, with the proviso that the heating must not be carried out too long after the forming, and the rate of heating of the coating must not be too slow. If the heating is too long after forming, or is too slow, cracks may appear even during the heating-up process. If the heating is carried out immediately after forming, the heating-up time may be as long as 30 minutes; if the formed sheet or foil has been stored for an hour after forming, the heating-up time must be much shorter, about 10 seconds giving satisfactory results. The heating should therefore advantageously be carried out not more than 1 hour after the forming operation.

Furthermore, if the heating-up time is too long, it may happen that the resin coating shrinks during heating at the borders of the sheet-metal article which have not been deformed or deformed only to a low degree during shaping the article. This is especially the case at the border flange of deep-drawn containers. During shrinking, the coating disengages from the edge of the border and forms radial wrinkles on the border flange. Such wrinkles appear for example on containers formed from foil which had been coated with a film of low-pressure polyethylene using high-pressure polyethylene applied from the melt as adhesive. This shrinkage is perhaps due to the difference in the melting points of the film and the adhesive. It may be avoided if the heating-up is carried out in such a way that the coating is melted in less than a second at least at the parts of the sheet-metal article which were only slightly deformed. That means, the resin film and the adhesive should practically be molten at the same time in spite of their different melting points.

The necessary temperature for melting the coating depends on the resin used. A quick melting of the coating needs a large temperature gradient between heating medium and sheet-metal article. On the other hand, the coating must not be heated so high that the coating is decomposed. Temperature and duration of heating must be so correlated that the coating melts quickly without reaching a temperature much over its melting point.

The layer of thermoplastic synthetic resin may be applied to the sheet metal as a lacquer (i.e. a solution or dispersion in a suitable liquid medium), by coating with the molten synthetic resin, or by cementing a synthetic resin film onto the sheet metal, in which latter case the adhesive may also be a thermoplastic material.

Polyolefine, such as polyethylene and polypropylene are particularly suitable thermoplastic synthetic resins, but vinyl synthetic resins may also be used. The resin may be pigmented, if desired.

Example

Aluminum strip 0.145 mm. thick was coated with a film of low-pressure polyethylene 0.05 mm. thick using high-pressure polyethylene applied from the melt as adhesive. The coated strip was formed by deep drawing into shallow containers which were thereafter subjected to the treatments given in the following table:

TABLE

| Test Storage after forming | Heating (° C.) to— | Heating-up time | After sterilization treatment at 121° C. for 1 hour |
|---|---|---|---|
| 1. Extended period | None | | Marked crack formation. |
| 2. 55 min | 140 | 10 sec | No crack formation. |
| 3. 55 min | 140 | 15 sec | Cracks. |
| 4. 30 min | 140 | 60 sec | No cracks. |
| 5. 30 min | 140 | 90 sec | Cracks. |
| 6. 10 min | 140 | 8 min | No cracks. |
| 7. 10 min | 140 | 10 min | Cracks. |

Containers not heated after forming until the coating melted showed marked crack formation in all cases on being subjected to sterilization treatment. In some cases cracks were formed even without sterilization treatment, and the synthetic resin film became detached from the aluminum after fairly long storage. If the coated containers are heated until the coating melts, whether or not cracks appear during sterilization treatment depends on the correlation between the storage time after forming and on the rate at which heating-up is carried out. In the case of tests 2, 4 and 6, the heating-up time may of course be less than the figures of 10 seconds, 60 seconds and 8 minutes quoted, with the same results; for example, the heating-up time may be as short as 1 second or less if the formed sheet is heated in a gas flame, what is necessary to avoid shrinkage of the coating at the borders of deep-drawn containers.

Containers produced as described were filled with olive oil which was colored with lycopene and stored for 20 minutes at 130° C. After cooling, the olive oil was washed out. In those containers in which the synthetic resin coating had not been melted after the forming, the coating was heavily stained and could be scratched off easily. In the case of the containers treated according to the invention, the coating was scratch-resistant and was not stained.

What we claim is:

1. A process for the manufacture of articles from sheet metal in which the sheet metal is first coated with a synthetic thermoplastic resin, the coated sheet is then formed into the article and the coating of resin on the article subsequently heated up to its melting point and allowed to cool, the rate of heating and the time which has elapsed since the forming operation being so correlated that stresses in the coating of resin are greatly reduced.

2. A process according to claim 1 in which the heating of the coating of resin to its melting point is carried out within one hour of the forming operation.

3. A process according to claim 1 in which all aluminum strip is coated with a polyolefin as a step in the formation of a container.

4. A process according to claim 1 in which aluminum foil is coated with a polyolefin as a step in the formation of a container.

5. A process according to claim 1 in which the polyolefin is a member of the group consisting of polyethylene and polypropylene.

6. A process according to claim 1 in which the heating time for melting the coating at least at the slightly deformed parts of sheet-metal article is less than one second.

References Cited

UNITED STATES PATENTS

| | | | |
|---|---|---|---|
| 2,756,493 | 7/1956 | Hall et al. | 72—46 |
| 3,177,564 | 4/1965 | Reynolds et al. | 72—46 |

RICHARD J. HERBST, *Primary Examiner.*

RONALD D. GREFE, *Examiner.*